Nov. 8, 1932.    C. MINTNER    1,887,034
APPARATUS FOR CHARGING RETORTS
Filed March 16, 1931    2 Sheets-Sheet 1
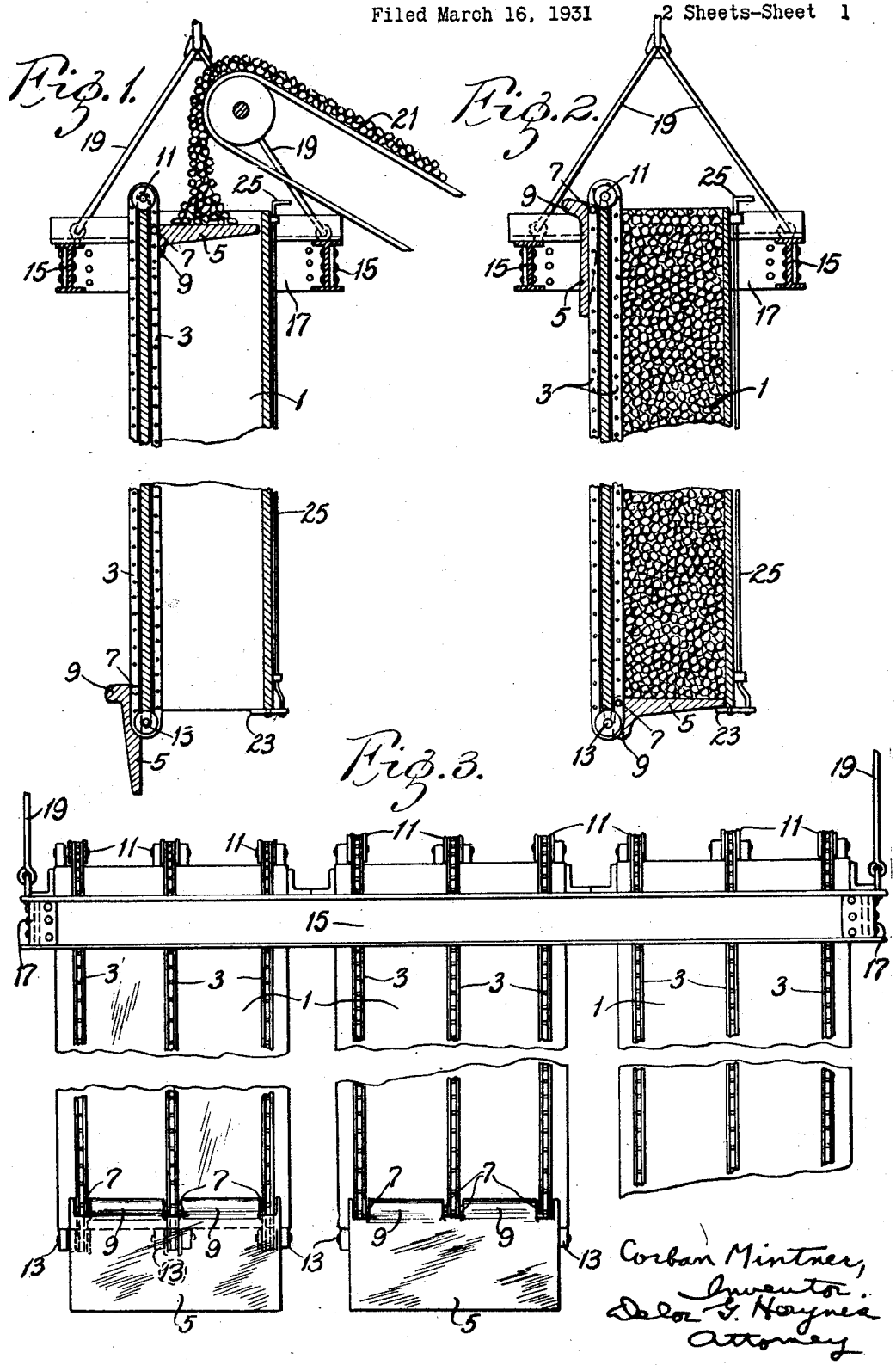

Nov. 8, 1932.  C. MINTNER  1,887,034

APPARATUS FOR CHARGING RETORTS

Filed March 16, 1931  2 Sheets-Sheet 2

Patented Nov. 8, 1932

1,887,034

UNITED STATES PATENT OFFICE

CORBAN MINTNER, OF ST. LOUIS, MISSOURI, ASSIGNOR TO ST. LOUIS & O'FALLON COAL COMPANY, OF ST. LOUIS, MISSOURI, A CORPORATION OF MISSOURI

APPARATUS FOR CHARGING RETORTS

Application filed March 16, 1931. Serial No. 522,965.

This invention relates to apparatus for charging retorts, and, with regard to certain more specific features, to the handling and charging of unfinished fuel briquettes into retorts for their carbonization.

Among the several objects of the invention may be noted the provision of apparatus of the class described which is adapted to handle unfinished raw fuel briquettes and like fragile materials, whereby they are conveyed with a minimum of breakage from their point of formation to the retort in which they are to be carbonized; charging apparatus of the class described wherein the raw fuel briquettes are prevented from falling through a distance such that they are likely to become broken or deformed; the provision of charging apparatus of the class described which is adapted for gang operation; the provision of charging apparatus of the class described which is relatively simple in construction and operation and which requires a minimum number of moving parts. Other objects will be in part obvious and in part pointed out hereinafter.

The invention accordingly comprises the elements and combinations of elements, features of construction, and arrangements of parts, which will be exemplified in the structure hereinafter described, and the scope of the application of which will be indicated in the following claims.

In the accompanying drawings, in which is illustrated one of various possible embodiments of the invention, Fig. 1 is a vertical section of a charging basket in position adapted to receive its charge;

Fig. 2 is a vertical section similar to Fig. 1, illustrating the charging basket in its completely filled condition;

Fig. 3 is a front elevation of a bank of charging baskets such as illustrated in Fig. 1; and, Fig. 4 is a vertical section illustrating a charging basket such as shown in Fig. 1 positioned in the retort for delivery of its contents thereto.

Similar reference characters indicate corresponding parts throughout the several views of the drawings.

Figure 4:
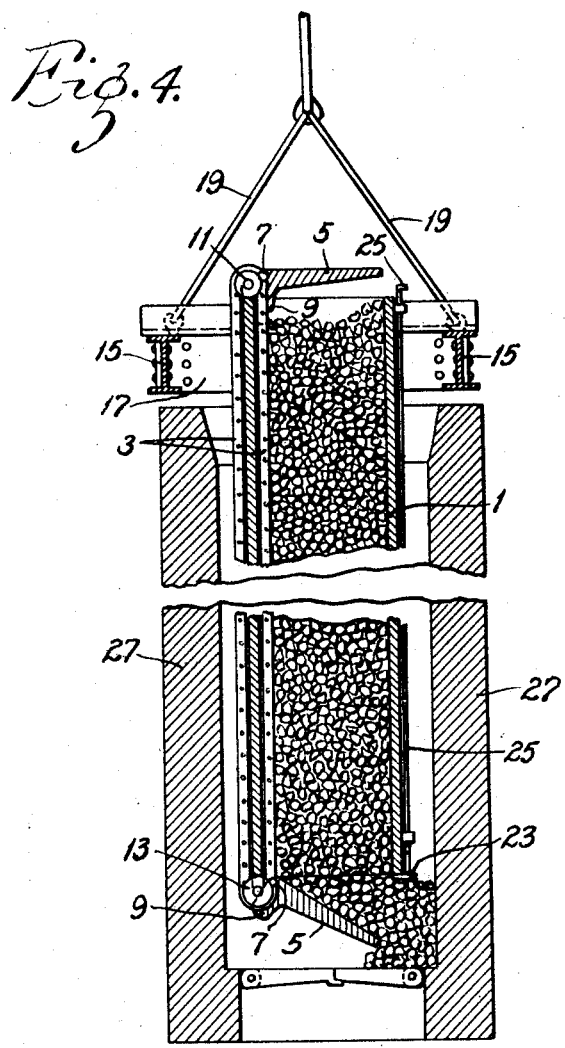

Referring now more particularly to Fig. 1, there is illustrated at numeral 1 a relatively narrow, open-ended basket, adapted in size to fit within a customarily shaped carbonization retort.

The basket 1 is preferably formed of sheet steel or similar metal, resistant to wear. Supported on one side of the basket 1, preferably by means of one or more chain belts 3, are one or more movable bottoms 5. The bottoms 5 are preferably hinged to a chain conveyor belt 3 as at numeral 7, and include projecting supporting brackets 9 which serve to hold the bottoms 5 in substantially horizontal position within the basket 1. The chain belts 3 are carried in rotatable bearings 11 and 13 at the top and bottom of the side of the basket 1. The bearings 11, 13 and the belts 3 have inherently a substantial frictional effect which is made use of, as described hereinafter.

A number of baskets similar to basket 1 are preferably ganged together, and supported near the top with an arrangement of I-beams 15 and cross beams 17, for optimum operating efficiency. The beams 15 may be supported as by rods 19 from a crane or the like.

At one position in the coking plant are desirably arranged a number of charging belts or conveyors 21. The belts 21 carry raw briquettes from the molding machine or the like in which they are formed to the top of the charging baskets 1.

With the charging baskets 1 suitably positioned near the delivery belt 21, one of the bottoms 5 is brought into position substantially at the top of the basket 1 by moving the chain belt 3. The position of the elements is then substantially as illustrated in Fig. 1. Raw briquettes are delivered from the belt 21 onto the bottom 5, the arrangement being such that the briquettes are not allowed to fall more than the order of 3 feet, which is the maximum through which such briquettes may ordinarily fall and yet retain their desired shape. As the briquettes are delivered on to the bottom 5, the weight on the bottom 5 is increased, and eventually the friction occasioned by the belt 3 sliding over the bearings 11 is overcome, with the result that the bottom 5 moves gradually downwardly. Thus the bottom 5 is always substantially in such position that the raw briquettes coming from the conveyor belt 21 are continuously falling only substantially to the top of the basket 1, or, at least not through a distance causing them to break. This operation continues until the bottom 5 reaches the lower end of the basket 1, at which position it is checked and held by a latch 23 manipulated from the top of the basket 1 by a rod 25. The basket thus filled is illustrated in Fig. 2.

It will be seen that the basket filled in this manner contains a relatively large quantity of raw briquettes in a mass having a considerable vertical height, but that this mass has been collected without any of the briquettes falling through a distance which might break up the briquettes and destroy their desired shape.

A gang of baskets 1 thus filled are thus made ready for delivery into the carbonization retort. This step is illustrated diagrammatically in Fig. 4. The filled basket 1 is moved, as by the traveling crane indicated hereinbefore, and let down into the interior of a retort 27. It is desirable that the bottom of the basket 1 be positioned the order of two feet from the bottom of the retort 27, in order that the bottom 5 of the basket 1 may be permitted to open, but such that the briquettes will not be required to fall through more than two to three feet, for the reasons described hereinbefore. With the basket 1 so positioned in the retort 27, the rod 25 is manipulated to remove the latch 23, whereupon the weight of the briquettes forces the bottom 5 downwardly and rotates it out of the way, thus delivering the charge of briquettes into the retort 27 without necessitating the falling of any of the briquettes through a distance such as would be disruptive of their shape.

With the bottom 5 thus removed from the path of the contents of the basket 1, the basket 1 is slowly pulled from the retort 27, and leaves its charge of raw briquettes within the retort.

While the bottom 5 of the basket 1 has been moving downwardly, as described, during the filling operation, the second bottom on the chain belt 3 has moved upwardly into position such that it is now ready to receive another charge of raw briquettes. The basket 1 is accordingly returned to the vicinity of the delivery belt 21, and refilled for the charging of another retort.

It is thus seen that through the use of the present charging apparatus raw briquettes are conveyed from their point of manufacture to the interior of the carbonization retort without at any time falling through a distance which might cause them to break up or otherwise lose their desired shape. Unless a charging basket of the type described herein is used, it is necessary either that a special, very shallow retort be used for the carbonization, with the attendant disadvantages of heat loss, restricted volume of charge, and the like, or that with an ordinary size retort, the briquettes are permitted to fall to the bottom thereof in charging, with the disadvantage that they are broken up as described hereinbefore.

It is to be understood that the type of movable bottom illustrated herein is by way of example only, and that other suitable baskets with movable bottoms might equally well be provided. For example, a bottom supported on cables balanced by counterweights might be equally well adapted for carrying out the present invention. The idea is that the bottom of the charging basket should be movable so that it can be brought to the top of the basket as filling is commenced, and lowered to the bottom as the filling proceeds.

It is likewise to be understood that the charging baskets shown may be used individually or in gangs as determined by the size and construction of the coking plant. Where the baskets are ganged, it is to be understood that the gang is lowered simultaneously into adjacent retorts, the latter being ordinarily built in rows.

As an alternative method of utilizing the charging means hereinbefore described, it is to be noted that the charging basket need not itself be lowered into the retort, but such basket may be permanently mounted, and an ordinary basket with a customary false bottom may then be brought up under the charging basket. The charging basket is then emptied into the second basket in the manner described for emptying into the retort (the second basket being withdrawn downwardly in place of removing the charging basket vertically upwardly). This second basket may then be emptied into the retort. By this method, the charging basket may be made stationary, and used in a continuous manner.

It is further to be noted that essentially the chain belt 3 and bottoms 5 comprise a conveyor, permanently mounted on the side of the basket. The present invention likewise includes the use of a removable conveyor of similar function, with a plain basket having a false bottom.

In view of the above, it will be seen that the several objects of the invention are achieved and other advantageous results attained.

As many changes could be made in carrying out the above constructions without departing from the scope of the invention, it

I claim:

1. Charging means for carbonizing retorts comprising a basket, a bottom for said basket, and means for moving said bottom vertically within said basket, substantially from the top to the bottom thereof.

2. Charging means for carbonizing retorts comprising a basket having open ends, a bottom for said basket means for moving said bottom vertically within said basket, substantially from the upper to the lower end thereof, and means for temporarily holding said bottom at the lower end of said basket.

3. Charging means for carbonizing retorts comprising a basket having open ends, a bottom for said basket and means for moving said bottom vertically within said basket, said bottom being normally positioned near the upper end of said basket but being adapted to move downwardly toward the lower end of said basket as material is fed into said basket.

4. Charging means for carbonizing retorts comprising a basket having open ends, a bottom for said basket means for moving said bottom vertically within said basket, said bottom being normally positioned near the upper end of said basket but being adapted to move downwardly toward the lower end of said basket as material is fed into said basket, and means for temporarily holding said bottom at the lower end of said basket.

5. Charging means for carbonizing retorts comprising a basket having open ends, at least one movable belt supported in bearings on one side of said basket, said belt carrying a bottom, whereby said bottom is vertically movable within said basket.

6. Charging means for carbonizing retorts comprising a basket having open ends, at least one movable belt supported in bearings on one side of said basket, said belt carrying a bottom, whereby said bottom is vertically movable within said basket, and means for temporarily holding said bottom at the lower end of said basket.

7. Charging means for carbonizing retorts comprising a basket having open ends, at least one movable, continuous chain belt supported in bearings on one side of said basket, at least one bottom for said basket rotatably supported in said chain belt, said bottom being adapted to move vertically within said basket, and means at the lower end of the basket for holding said bottom temporarily in closing position.

8. Charging means for carbonizing retorts comprising a basket having open ends, at least one movable, continuous chain belt supported in bearings on one side of said basket, at least one bottom for said basket rotatably supported in said chain belt, said bottom being adapted to move vertically within said basket, and means at the lower end of the basket for holding said bottom temporarily in closing position and means at the top of said basket for operating said last-named means to release the bottom to assume an opening position.

In testimony whereof, I have signed my name to this specification this 14th day of March, 1931.

CORBAN MINTNER.